United States Patent
Harrison et al.

(10) Patent No.: US 10,758,910 B2
(45) Date of Patent: Sep. 1, 2020

(54) HORIZONTAL GRINDING MACHINE WITH ENGINE FUEL CONSUMPTION CONTROL

(71) Applicant: Astec Industries, Inc., Chattanooga, TN (US)

(72) Inventors: David Lynn Harrison, Eugene, OR (US); Lawrence Robert Cumming, Eugene, OR (US); Glenn Ford Bittrolf, Eugene, OR (US)

(73) Assignee: Astec Industries, Inc., Chattanooga, TN (US)

( * ) Notice: Subject to any disclaimer, the term of this patent is extended or adjusted under 35 U.S.C. 154(b) by 615 days.

(21) Appl. No.: 15/372,615

(22) Filed: Dec. 8, 2016

(65) Prior Publication Data

US 2017/0165674 A1   Jun. 15, 2017

Related U.S. Application Data

(60) Provisional application No. 62/265,104, filed on Dec. 9, 2015.

(51) Int. Cl.
*B02C 25/00* (2006.01)
*B02C 4/02* (2006.01)
(Continued)

(52) U.S. Cl.
CPC .............. *B02C 4/02* (2013.01); *A01G 3/002* (2013.01); *A01G 23/067* (2013.01);
(Continued)

(58) Field of Classification Search
CPC ......... B02C 4/02; B02C 18/225; B02C 18/24; B02C 23/02; B02C 23/18; B02C 25/00; A01G 23/067
(Continued)

(56) References Cited

U.S. PATENT DOCUMENTS 3,620,154 A * 11/1971 Dodgen ................ A01F 29/005
                                                                99/485
6,814,320 B1   11/2004 Morey et al.
(Continued)

OTHER PUBLICATIONS

International Search Report and Written Opinion of counterpart PCT Application No. PCT/US2016/065527 dated Feb. 21, 2017.

*Primary Examiner* — Kenneth E Peterson
*Assistant Examiner* — Nhat Chieu Q Do
(74) *Attorney, Agent, or Firm* — Chambliss, Bahner & Stophel, P.C.; Stephen D. Adams

(57) ABSTRACT

A horizontal grinding machine includes a frame, a feed hopper that receives material to be processed, and a feed conveyor that moves material to be processed in a processing direction. A grinding cylinder rotates about a generally horizontal grinding axis. A feed roller assembly is mounted on the frame at the rear end of the feed hopper and in front of the grinding cylinder. The feed roller assembly includes a feed roller that rotates about a generally horizontal axis in a first direction that urges the material towards the grinding cylinder and a second direction that urges the material away from the grinding cylinder. A controller is operatively connected to the feed roller and to the feed conveyor and controls the rotational speed of the feed roller and the speed of the feed conveyor to obtain a predetermined ratio of feed roller rotational speed to feed conveyor speed.

11 Claims, 4 Drawing Sheets

(51) Int. Cl.
  *B02C 21/02* (2006.01)
  *B02C 18/24* (2006.01)
  *B02C 23/02* (2006.01)
  *B02C 23/18* (2006.01)
  *B02C 18/22* (2006.01)
  *A01G 3/00* (2006.01)
  *A01G 23/06* (2006.01)

(52) U.S. Cl.
  CPC ............ *B02C 18/225* (2013.01); *B02C 18/24* (2013.01); *B02C 21/02* (2013.01); *B02C 21/026* (2013.01); *B02C 23/02* (2013.01); *B02C 23/18* (2013.01); *B02C 25/00* (2013.01)

(58) Field of Classification Search
  USPC .......................................... 241/34–35, 186.3
  See application file for complete search history.

(56) References Cited

U.S. PATENT DOCUMENTS

| | | | |
|---|---|---|---|
| 6,830,204 B1 | 12/2004 | Morey | |
| 6,955,310 B1 | 10/2005 | Morey | |
| 7,077,345 B2* | 7/2006 | Byram | B02C 13/286 241/34 |
| 7,441,718 B2 | 10/2008 | Seaman et al. | |
| 7,637,444 B2 | 12/2009 | Stelter et al. | |
| 7,654,479 B2 | 2/2010 | Stelter et al. | |
| 7,874,504 B2* | 1/2011 | Chapman | A01G 3/002 144/356 |
| 8,684,291 B2 | 4/2014 | Galloway et al. | |
| 2004/0112999 A1* | 6/2004 | Byram | B02C 13/286 241/34 |
| 2004/0200911 A1* | 10/2004 | Hishiyama | B02C 18/24 241/33 |
| 2007/0034295 A1* | 2/2007 | Chapman | B02C 18/2283 144/356 |
| 2012/0234949 A1* | 9/2012 | Morey | B02C 18/24 241/28 |
| 2013/0037170 A1* | 2/2013 | O'Halloran | B27B 31/006 144/242.1 |
| 2013/0037171 A1* | 2/2013 | O'Halloran | B02C 18/225 144/242.1 |
| 2014/0166790 A1* | 6/2014 | Verhoef | B02C 18/225 241/30 |
| 2014/0263777 A1* | 9/2014 | Anderson, Jr. | B02C 4/42 241/30 |
| 2015/0217302 A1* | 8/2015 | Dumpor | B02C 25/00 241/28 |
| 2015/0290654 A1* | 10/2015 | Permi | B02C 25/00 241/24.1 |
| 2019/0054476 A1* | 2/2019 | Green | B02C 25/00 |

* cited by examiner

HORIZONTAL GRINDING MACHINE WITH ENGINE FUEL CONSUMPTION CONTROL

CROSS-REFERENCE TO RELATED APPLICATION

This application claims the benefit of U.S. Provisional Patent Application No. 62/265,104 which was filed on Dec. 9, 2015.

FIELD OF THE INVENTION

The present invention relates generally to a grinding machine for converting tree stumps, logs, and brush into chips, and to a system and method for controlling the operation of the grinding machine, particularly when used for grinding relatively uniformly sized feed materials.

BACKGROUND OF THE INVENTION

A grinding machine is a self-propelled or portable machine that is used to reduce trees, brush and other materials by tearing, shredding, impacting or shearing such materials to a relatively uniform particle size. A horizontal grinding machine typically has a hopper for feed material at the front of the machine and a feed mechanism for advancing material from the front hopper to a grinding mechanism in a generally horizontal direction. The feed mechanism may include a feed conveyor at the bottom of the hopper and one or more feed roller assemblies located above and in front of the grinding mechanism. The grinding mechanism usually comprises a drum or series of discs having cutting components disposed around the periphery. A grate is also typically located behind the grinding drum or discs to provide some measure of control over the particle size of the material being reduced. A discharge chute or conveyor is located adjacent to and behind the grinding mechanism to channel or convey material that has been reduced by the grinding mechanism away from the machine. A power source that may include an internal combustion engine and a hydraulic circuit containing one or more hydraulic motors is provided to power and operate the grinding mechanism, feed mechanism and (if provided) the discharge conveyor.

The production rate of a horizontal grinder is maximized when the feed mechanism is operated to maximize the processing of material through the machine without contributing to or causing stalling due to overfeeding. The production efficiency of a horizontal grinder is maximized when the feed mechanism is operated so as to limit material flow to a steady predetermined rate that gives the greatest production output per unit of fuel burned. Engine overloading is avoided when the feed mechanism is operated to limit material flow so the power required to reduce the material is equal to or less than the allowable continuous power output of the engine. When grinding feed materials of varying sizes, using conventional machines and methods, it is impossible to maximize production efficiency or to regulate power demand by controlling the feed rate. However, feed rate control methods may be employed to maximize production rates and efficiencies without overloading the engine when grinding feed materials having a uniformly small particle size range.

Grinding to reduce previously reduced material to an even smaller particle size is termed re-grinding. Because re-grinding processes previously-reduced material, the production rate and efficiency of a grinding machine engaged in re-grinding may be maximized without overloading the engine by controlling the feed rate. Re-grinding produces the most desirable product when the grinding mechanism is fed at a constant rate to keep the grinding chamber full but not flooded with material. This feed rate is termed "choke feeding", and it is particularly important when re-grinding of woody materials is used to create mulch, especially mulch to which a colorant or other additive is applied. Choke feeding in the creation of mulch will generally insure that the colorant or additive is uniformly distributed in the final mulch product.

The feed rate of a grinding machine engaged in re-grinding can be further controlled for maximum efficiency or to limit engine power demand. Such feed rate control is termed "regulated feeding". Regulated feeding enables the engine to operate at a controlled rate, thereby optimizing fuel use and maximizing the operating life of the engine.

Controlled feeding in a grinding machine can be achieved by pinning the feed roll assembly at a fixed height with respect to the grinding mechanism or by using a leveling bar ahead of the feed roll assembly to limit the height of the feed stream into the grinding mechanism. However, pinning the feed roll assembly in a raised position may impede the safety characteristics of the feed roll assembly, and a leveling bar is an added component to the machine. Furthermore, neither of these known methods for achieving controlled feeding permits control of the maximum continuous power output of the engine so as to increase engine life and maximize fuel efficiency. Consequently, it would be desirable if other systems and mechanisms could be provided for maintaining choke feeding or regulated feeding during operation of a grinding machine.

Advantages of the Invention

Among the advantages of a preferred embodiment of the invention is that it provides a system for maintaining choke feeding or regulated feeding of a grinding machine that is safe to operate and requires no leveling bar or other structural components to be added to the machine, except for components associated with a controller. Other advantages and features of this invention will become apparent from an examination of the drawings and the ensuing description.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic. All methods described herein can be performed in any suitable order unless otherwise specified herein or clearly indicated by context.

Terms concerning attachments, coupling and the like, such as "connected" and "interconnected", refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity. Several terms are specifically defined herein. These terms are to be given their broadest possible construction consistent with such definitions, as follows:

The term "above" and similar terms, when used in reference to a relative direction on or with respect to a horizontal grinding machine, or a component or portion of such a machine, refer to a relative direction that is farther away from the surface on which the machine is placed in order to process material.

The term "processing direction" refers to the direction of travel of a log or other material to be reduced during processing in a horizontal grinding machine.

The term "front end" and similar terms refer to the end of a horizontal grinding machine, or a component or portion of such a machine, which is nearest the point at which feed material to be processed is introduced into the machine.

The term "in front of", and similar terms, as used herein to describe a relative position or direction on or in connection with a horizontal grinding machine, or a component of such a machine, refer to a relative position or direction towards the front end of the machine.

The term "rear end" and similar terms refer to the end of a horizontal grinding machine, or a component or portion of such a machine, which is farther from the front end of the machine, component or portion thereof.

The term "behind", and similar terms, as used herein to describe a relative position or direction on or in connection with a horizontal grinding machine or a component of such a machine, refer to a relative position or direction towards the rear end of the machine.

The term "actuator" refers to an electric, hydraulic, electro-hydraulic, pneumatic or mechanical device that is adapted to apply a force to a component of a horizontal grinding machine with respect to the housing, frame or another component of the machine.

The term "linear actuator" refers to an actuator that generates force which is directed in a straight line. Common examples of "linear actuators" include double-acting hydraulic or pneumatic actuators which include a cylinder, a piston within the cylinder, and a rod attached to the piston. By increasing the pressure within the cylinder on one side of the piston (over that on the opposite side of the piston), the rod will extend from the cylinder or retract into the cylinder.

The term "engine control module" refers to any device or component that is adapted to communicate information to a controller for the horizontal grinding machine which is equipped with an engine that the controller can use to determine the fuel consumption rate of the engine.

SUMMARY OF THE INVENTION

The invention comprises a horizontal grinding machine that is adapted to process material. The grinding machine includes a frame and a feed hopper that is adapted to receive the material to be processed. A feed conveyor is associated with the feed hopper and adapted to move the material in a processing direction. A grinding cylinder is adapted to rotate about a generally horizontal grinding axis, and a feed roller assembly is mounted on the frame at the rear end of the feed hopper and in front of the grinding cylinder. The feed roller assembly includes a feed roller that is adapted to rotate about a generally horizontal axis in a first direction that urges the material towards the grinding cylinder and a second direction that urges the material away from the grinding cylinder. A controller is operatively attached to the feed roller and adapted to control the rotational speed of the feed roller. The controller is also operatively attached to the feed conveyor and adapted to control the speed of the feed conveyor. Furthermore, the controller is adapted to control the rotational speed of the feed roller and the speed of the feed conveyor in order to obtain a predetermined desired ratio of feed roller rotational speed to feed conveyor speed.

A preferred embodiment of the invention includes a power unit having an engine and an engine control module that is operatively connected to the controller and adapted to communicate to the controller a signal indicating the rate of fuel consumption of the engine. The controller is also operatively attached to the engine and adapted to control at least some aspects of the operation of the engine. In this embodiment of the invention, the controller is adapted to adjust the speed of the feed conveyor proportionally to the fuel consumption rate of the engine.

In order to facilitate an understanding of the invention, the preferred embodiment of the invention, as well as the best mode known by the inventors for carrying out the invention, is illustrated in the drawings, and a detailed description thereof follows. It is not intended, however, that the invention be limited to the particular embodiment described or to use in connection with the apparatus illustrated herein. Therefore, the scope of the invention contemplated by the inventors includes all equivalents of the subject matter recited in the claims, as well as various modifications and alternative embodiments such as would ordinarily occur to one skilled in the art to which the invention relates. The inventors expect skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiments of the invention are illustrated in the accompanying drawings, in which like reference numerals represent like parts throughout, and wherein.

DESCRIPTION OF THE PREFERRED EMBODIMENT OF THE INVENTION

Figure 1:
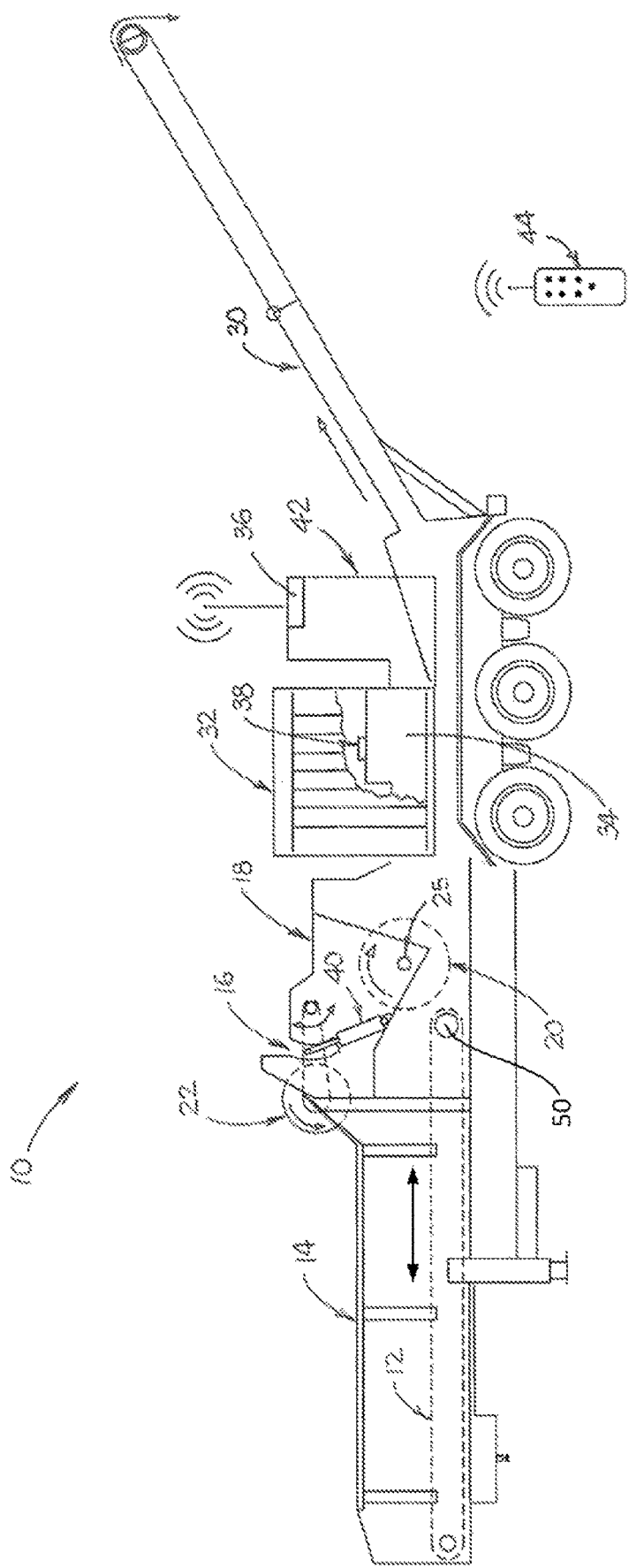
FIG. 1 is a side view, partially in section, of a horizontal grinding machine that is equipped with the control system of the invention, showing: (a) the direction of rotation of its feed roller during normal operation; (b) the range of vertical motion of the feed roller support and thus, the feed roller; and (c) the direction of rotation of the grinding cylinder.

This description of preferred embodiments of the invention is intended to be read in connection with the accompanying drawings, which are to be considered part of the entire written description of this invention. The drawing figures are not necessarily to scale, and certain features of the invention may be shown exaggerated in scale or in somewhat schematic form in the interest of clarity and conciseness.

Figure 2:
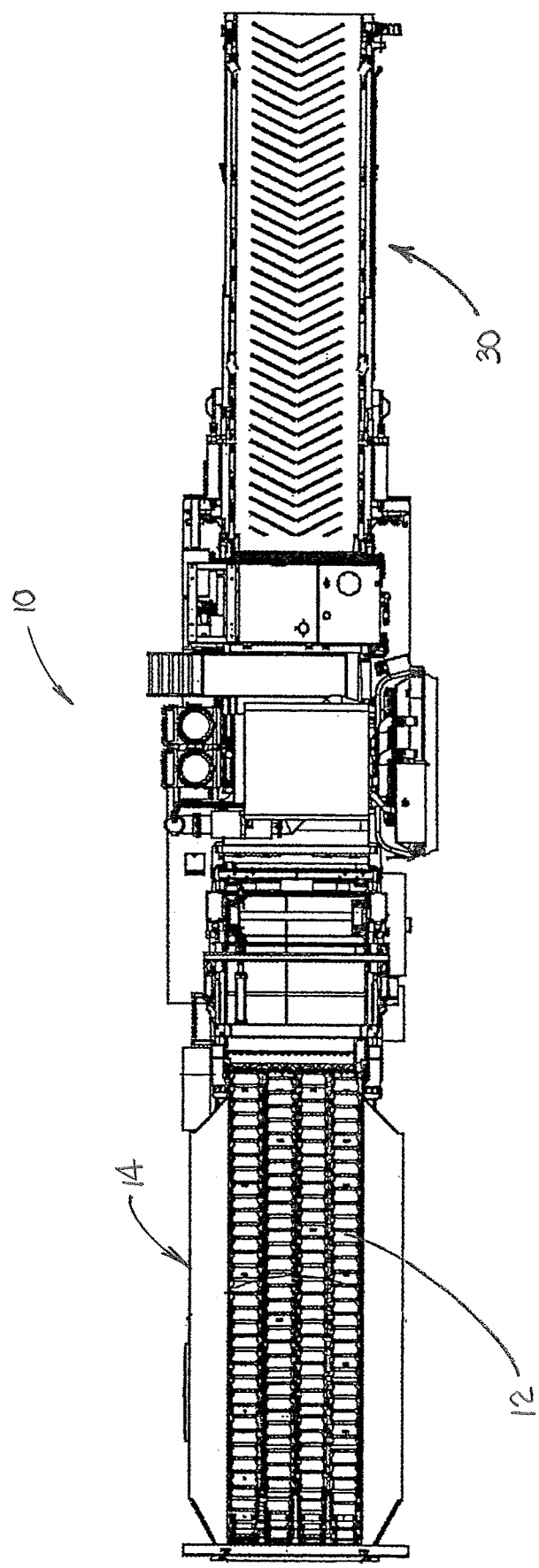
FIG. 2 is a top view of the machine shown in FIG. 1.
Figure 3:
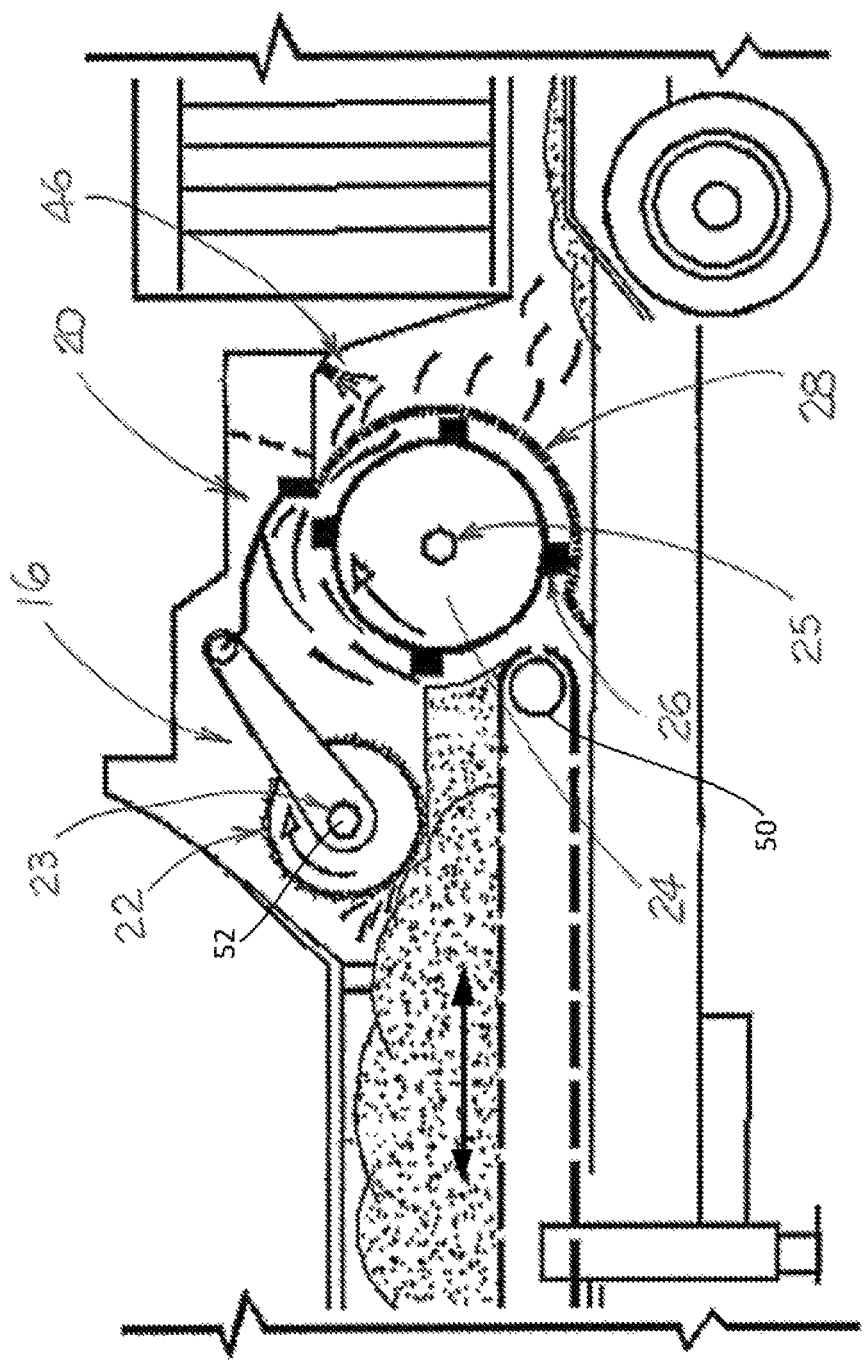
FIG. 3 is a side view, partially in section of a portion of the machine illustrated in FIGS. 1 and 2, showing the placement and direction of rotation of its feed roller relative to a feed stream of uniformly sized feed material.

As shown in FIGS. 1 and 2, machine 10 is a horizontal grinding machine that is adapted to process logs, stumps, brush or other woody materials. The material to be processed is placed on a feed conveyor 12 that is located at the bottom of and is associated with feed hopper 14. Conveyor 12 is operated by a conventional drive system 50 to carry the material in processing direction D (to the right, as shown in FIG. 1) to feed roller assembly 16. This drive system 50 is adapted to drive conveyor 12 in both forward and reverse directions (i.e., to the right and left, respectively, as shown in FIG. 1), and at variable speeds. Feed roller assembly 16 is pivotally mounted on the frame 18 of the machine at the rear end of feed hopper 14 and above and in front of grinding mechanism 20. Feed roller 22 of feed roller assembly 16 is operated by a conventional drive system 52 to drive feed roller 22 in both clockwise and counter-clockwise directions (as shown in FIGS. 1 and 3) about a generally horizontal rotation axis 23 that is perpendicular to the page as viewed in FIG. 3, and at variable speeds. Feed roller 22 is adapted to rotate in a counter-clockwise direction (as shown in FIG. 1) when the machine is operated in its normal mode of operation to urge material in the feed hopper into contact with the grinding mechanism. Grinding mechanism 20 comprises a horizontally mounted grinding cylinder 24 having cutting elements 26 disposed on its annular surface, as shown in FIG. 3. Grinding cylinder 24 is adapted to rotate in a clockwise direction (as shown in FIG. 1) about a generally horizontal grinding axis 25 (shown in FIG. 3 as oriented perpendicular to the page).

Material that is processed by the grinding mechanism passes through grate 28 and onto discharge conveyor 30 for removal from the machine. Power unit 32, which preferably includes internal combustion engine 34 and a conventional hydraulic circuit containing one or more hydraulic motors (not shown) is provided to power and operate grinding cylinder 24, the drive system for feed conveyor 12, the drive system for feed roller 22 and the drive system for discharge conveyor 30.

The control system includes controller 36 that is operatively attached to engine control module 38 that is operatively connected to the controller and adapted to communicate to the controller a signal indicating the rate of fuel consumption of engine 34. Controller 36 is also operatively attached to engine 34, the drive systems for feed conveyor 12 and feed roller 22, and to a lifting mechanism, preferably comprising one or more linear actuators 40, for adjusting the vertical location of feed roller 22. Controller 36 is located in operator's station 42 of machine 10 (shown in FIG. 1) and is adapted to control at least some aspects of the operation of engine 34, the operation of the drive systems for feed conveyor 12 and feed roller 22, and the lifting mechanism for adjusting the vertical location of feed roller 22. The controller may be operated from operator's station 42 or remotely via remote controller 44 (shown in FIG. 1). Preferably, the controller operates the drive system for rotating feed roller 22 and the drive system for feed conveyor 12 during normal operating conditions so that the ratio of feed roller rotational speed to feed conveyor speed is about 1.5, when the rotational speed of the feed roller is converted to a linear speed (RPM×2πr) and both speeds are expressed in terms of linear distance per unit of time.

Figure 4:
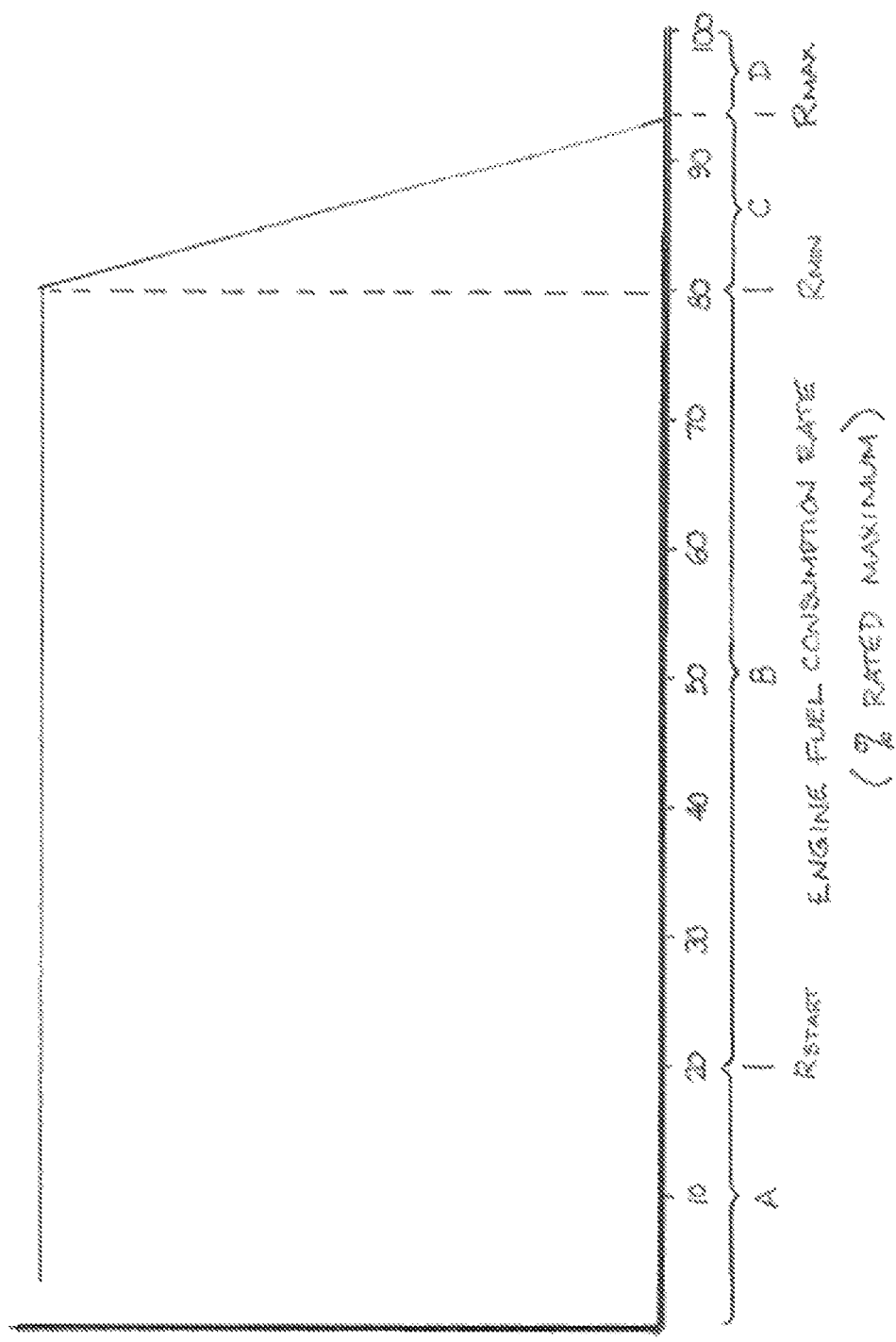
FIG. 4 is a graphical illustration of selected operating parameters for a preferred embodiment of the invention.

Preferably, controller 36 will adjust the speed of feed conveyor 12 proportionally to the engine fuel consumption rate as the machine is operated. FIG. 4 illustrates a preferred mode of operation of the invention for which good results have been obtained by selecting a predetermined starting load fuel consumption rate $R_{START}$ to be about 20% of the maximum rated fuel consumption rate of the engine, a predetermined minimum operating fuel consumption rate $R_{MIN}$ to be about 80% of the maximum rated fuel consumption rate of the engine, and a predetermined maximum operating fuel consumption rate $R_{MAX}$ to be about 93% of the maximum rated fuel consumption rate of the engine. Of course, other rates may be selected, so long as $R_{MAX}$ is greater than $R_{MIN}$ and $R_{MIN}$ is greater than $R_{START}$.

When the engine is started and the engine is consuming fuel at a rate equal to or less than $R_{START}$, i.e., at a fuel consumption rate within range "A" shown in FIG. 4, the controller will operate the drive system for feed conveyor 12 to move material out of feed hopper 14 towards feed roller assembly 16. Then, if the engine fuel consumption rate increases from $R_{START}$ to a rate that is no greater than $R_{MIN}$, i.e., at a fuel consumption rate with range "B" shown in FIG. 4, controller 36 will cause the lifting mechanism to lift feed roller assembly 16 to a predetermined raised position, such as for example, to raise the bottom of feed roller 22 about 25 inches above the surface of feed conveyor 12, and hold it in the raised position. As the feed roller assembly is lifted, the direction of rotation of the feed roller is reversed, as shown by comparing FIGS. 1 and 3, and the controller adjusts the feed roller rotational speed and/or the feed conveyor speed to reduce the ratio of feed roller rotational speed to feed conveyor speed to a predetermined lower ratio. Preferably, the ratio of feed roller speed to feed conveyor speed in this re-grind mode is reduced to about 0.7. These adjustments cause the feed roller to push the upper portion of the feed stream away from the grinding mechanism inlet instead of towards it. If the controller determines that the engine fuel consumption rate is reduced to $R_{START}$, the controller will lower the feed roller assembly to its original position and again reverse its direction of rotation so that it directs material towards the grinding mechanism. The controller will also adjust the feed roller rotational speed and/or the feed conveyor speed to return the ratio of feed roller rotational speed to feed conveyor speed to its normal operating value, i.e., to a value of about 1.5. If a colorant or other additive is being applied in the re-grinder mode, the controller is also operatively attached to a conventional additive supply system (not shown) and is adapted to control the application of the additive through additive nozzle 46 (shown in FIG. 3) so that it is only introduced into the feed stream proportional to the material feed rate and only when feed material is present on the feed conveyor.

If the controller determines that engine 34 is consuming fuel at a rate greater than $R_{MIN}$ but no greater than $R_{MAX}$, i.e., at a fuel consumption rate within range "C" shown in FIG. 4, controller 36 will adjust the speed of feed conveyor 12 proportionally to the fuel consumption rate of engine 34. Thus, in this embodiment of the invention, when the engine fuel consumption rate increases between the predetermined minimum operating fuel consumption rate $R_{MIN}$ and the predetermined maximum operating fuel consumption rate $R_{MAX}$, controller 36 will reduce the speed of feed conveyor 12 proportionally. Similarly, when the engine fuel consumption rate decreases within the rates indicated by range "C" of FIG. 4, controller 36 will increase the speed of feed conveyor 12 proportionally. If the controller determines that engine 34 is consuming fuel at a rate that is greater than $R_{MAX}$, i.e., at a fuel consumption rate within range "D" shown in FIG. 4, controller 36 will stop the feed conveyor until the engine fuel consumption rate falls below $R_{MAX}$, at which point the controller will restart the feed conveyor in the forward direction.

The preferred embodiment of the invention thus comprises a system for controlling and maintaining a choke feed or regulated feed condition of a horizontal grinding machine. This control system includes a controller, means for determining real-time engine fuel consumption rates, a lifting mechanism for lifting the feed roller and a rotational drive for rotating the feed roller in both rotational directions so as to alternatively direct material towards or away from the grinding mechanism. The control system also includes a drive mechanism for the feed conveyor that is adapted to drive the feed conveyor at a variable speed and in both forward and reverse directions. In normal operation, when the engine fuel consumption rate is no greater than $R_{START}$, the controller will cause the feed conveyor drive mechanism and the rotational drive for the feed roller to operate at speeds that produce a predetermined desired ratio of feed roller rotational speed to feed conveyor speed. The controller will also cause the feed roller to rotate in the rotational direction that directs material towards the grinding mechanism. When the controller determines that the engine fuel consumption rate has increased beyond $R_{START}$, the controller will cause the lifting mechanism to lift the feed roller assembly to a predetermined raised position and hold it in the raised position. As the feed roller assembly is lifted, the direction of rotation of the feed roller is reversed to direct material away from the grinding mechanism, and the feed conveyor speed and/or the feed roller rotational speed are adjusted to reduce the ratio of feed roller rotational speed to feed conveyor speed to a predetermined lower level. In addition, the controller will operate the feed conveyor drive mechanism to drive the feed conveyor at a speed that is proportional to the engine fuel consumption rate. These adjustments cause the feed roller to push the upper portion of the feed stream away from the grinding mechanism inlet instead of towards it, and they prevent the engine from operating at a duty cycle that is outside the recommended range. If the engine fuel consumption rate increases to a rate between $R_{MIN}$ and $R_{MAX}$, the controller will cause the feed conveyor to slow down proportionally in response. If the engine fuel consumption rate decreases in the range between $R_{MIN}$ and $R_{MAX}$, the controller will cause the feed conveyor to speed up proportionally in response. If the engine fuel consumption rate increases so as to be greater than $R_{MAX}$, the controller will stop the feed conveyor until the engine fuel consumption rate falls below $R_{MAX}$, at which point the controller will restart the feed conveyor in the forward direction.

The inventors have found that this control system allows the engine of a horizontal grinding machine to operate at a controlled fuel consumption rate and the grinding mechanism of the machine to operate in a steady regulated feed or choke feed condition. When additives are added to the product in the re-grind mode, the additives are uniformly distributed. The regulated feed condition enables the machine operator to obtain maximum fuel economy and engine life. The choke feed condition enables the machine operator to obtain a preferred product quality by producing a more uniform product particle size. In many cases, both the advantages of the regulated feed condition and those of the choke feed condition can be achieved.

Although this description contains many specifics, these should not be construed as limiting the scope of the invention, but as merely providing illustrations of the presently preferred embodiment thereof, as well as the best mode contemplated by the inventors of carrying out the invention. The invention, as described herein, is susceptible to various modifications and adaptations, as would be understood by those having ordinary skill in the art to which the invention relates.

What is claimed is:

1. A method of operating a horizontal grinding machine to grind material, the horizontal grinding machine having a feed hopper with a feed conveyor located therein, a drive system for the feed conveyor that is adapted to drive the feed conveyor in both forward and reverse directions and at variable speeds, a feed roller assembly that is mounted at a rear end of the feed hopper and in front of a grinding cylinder, said feed roller assembly comprising a feed roller and a lifting mechanism that is adapted to adjust a vertical location of the feed roller, a drive system for the feed roller that is adapted to rotate the feed roller in both clockwise and counter-clockwise directions and at variable speeds, and a power unit that is adapted to operate the grinding cylinder, the drive system for the feed conveyor and the drive system for the feed roller, said power unit including an engine, wherein said method comprises:
    (a) providing a controller that is:
        (i) operatively connected to the drive system for the feed roller and adapted to control the rotational speed and the direction of rotation of the feed roller;
        (ii) operatively connected to the drive system for the feed conveyor and adapted to control the speed and the direction of the feed conveyor;
        (iii) adapted to receive a predetermined ratio of feed roller rotational speed to feed conveyor speed; and
        (iv) adapted to modify the rotational speed of the feed roller and the speed of the feed conveyor to obtain the predetermined ratio of feed roller rotational speed to feed conveyor speed;
    (b) providing a first predetermined ratio to the controller, wherein the first predetermined ratio is greater than 1.0;
    (c) operating the drive system for the feed roller and the drive system for the feed conveyor so that the ratio of feed roller rotational speed to feed conveyor speed is at the first predetermined ratio;
    (d) feeding material into the grinding machine and grinding the material using the grinding machine, wherein during the grinding process at least one of the feed roller rotational speed and feed conveyor speed is modified such that the ratio of feed roller rotational speed to feed conveyor speed is not at the first predetermined ratio; and
    (e) modifying at least one of the feed roller rotational speed and conveyor speed with the controller such that the ratio of feed roller rotational speed to feed conveyor speed returns to the first predetermined ratio.

2. The method of claim 1 which includes operating the drive system for the feed roller and the drive system for the feed conveyor so that the ratio of feed roller rotational speed to feed conveyor speed is 1.5.

3. The method of claim 1 which includes:
(a) operatively connecting the controller to an additive supply system;
(b) controlling an application of the additive to the material so that the additive is introduced to the material at a rate that is proportional to the feed conveyor speed.

4. The method of claim 1 which includes:
(a) providing an engine control module that is operatively connected to the controller and is adapted to communicate to the controller a signal indicating a rate of fuel consumption of the engine;
(b) adjusting the speed of the feed conveyor proportionally to the rate of fuel consumption of the engine.

5. The method of claim 4 which includes:
(a) providing the controller with a capability to receive a predetermined starting load fuel consumption rate for the engine;
(b) providing the controller with a capability to receive a predetermined minimum operating fuel consumption rate for the engine;
(c) providing the lifting mechanism for adjusting the vertical location of the feed roller;
(d) operatively connecting the controller to the lifting mechanism so that the controller is adapted to adjust the vertical location of the feed roller;
(e) lifting the feed roller and reversing the direction of rotation of the feed roller when the controller determines that the engine is consuming fuel at a rate which is greater than the predetermined starting load fuel rate and no greater than the predetermined minimum operating fuel consumption rate.

6. The method of claim 5 which includes adjusting the feed conveyor speed and/or the feed roller rotational speed as the feed roller is lifted to reduce the ratio of feed roller rotational speed to feed conveyor speed to a predetermined ratio that is less than the first predetermined ratio.

7. The method of claim 5 further comprising:
(a) providing the controller with a capability to receive a predetermined maximum operating fuel consumption rate for the engine;
(b) increasing the speed of the feed conveyor proportionally as the fuel consumption rate of the engine decreases, when the engine fuel consumption rate is between the predetermined minimum operating fuel consumption rate and the predetermined maximum operating fuel consumption rate;
(c) decreasing the speed of the feed conveyor proportionally as the fuel consumption rate of the engine increases, when the engine fuel consumption rate is between the predetermined minimum operating fuel consumption rate and the predetermined maximum operating fuel consumption rate.

8. The method of claim 7 which includes stopping the feed conveyor when the controller determines that the engine is consuming fuel at a rate that is equal to or greater than the predetermined maximum operating fuel consumption rate.

9. The method of claim 8 which includes restarting the feed conveyor after the controller has stopped the feed conveyor because the engine is consuming fuel at a rate that is equal to or greater than the predetermined maximum operating fuel consumption rate, if the controller determines that the engine is consuming fuel at a rate that is less than the predetermined maximum operating fuel consumption rate for the engine.

10. A method of operating a horizontal grinding machine to grind material, the horizontal grinding machine having a feed hopper with a feed conveyor located therein, a drive system for the feed conveyor that is adapted to drive the feed conveyor in both forward and reverse directions and at variable speeds, a feed roller assembly that is mounted at a rear end of the feed hopper and in front of a grinding cylinder, said feed roller assembly comprising a feed roller and a lifting mechanism that is adapted to adjust a vertical location of the feed roller, a drive system for the feed roller that is adapted to rotate the feed roller in both clockwise and counter-clockwise directions and at variable speeds, and a power unit that is adapted to operate the grinding cylinder, the drive system for the feed conveyor and the drive system for the feed roller, said power unit including an engine, wherein said method comprises:
(a) providing a controller that is:
(i) operatively connected to the drive system for the feed roller and adapted to control the rotational speed and the direction of rotation of the feed roller;
(ii) operatively connected to the drive system for the feed conveyor and adapted to control the speed and the direction of the feed conveyor;
(iii) adapted to receive a predetermined ratio of feed roller rotational speed to feed conveyor speed; and
(iv) adapted to modify the rotational speed of the feed roller and the speed of the feed conveyor to obtain the predetermined ratio of feed roller rotational speed to feed conveyor speed;
(b) providing a first predetermined ratio to the controller, wherein the first predetermined ratio is less than 1.0;
(c) operating the drive system for the feed roller and the drive system for the feed conveyor so that the ratio of feed roller rotational speed to feed conveyor speed is at the first predetermined ratio;
(d) feeding material into the grinding machine and grinding the material using the grinding machine, wherein during the grinding process at least one of the feed roller rotational speed and feed conveyor speed is modified such that the ratio of feed roller rotational speed to feed conveyor speed is not at the first predetermined ratio; and
(e) modifying at least one of the feed roller rotational speed and conveyor speed with the controller such that the ratio of feed roller rotational speed to feed conveyor speed returns to the first predetermined ratio.

11. The method of claim 10 wherein the first predetermined ratio is 0.7.

* * * * *